United States Patent Office 3,067,529
Patented Dec. 11, 1962

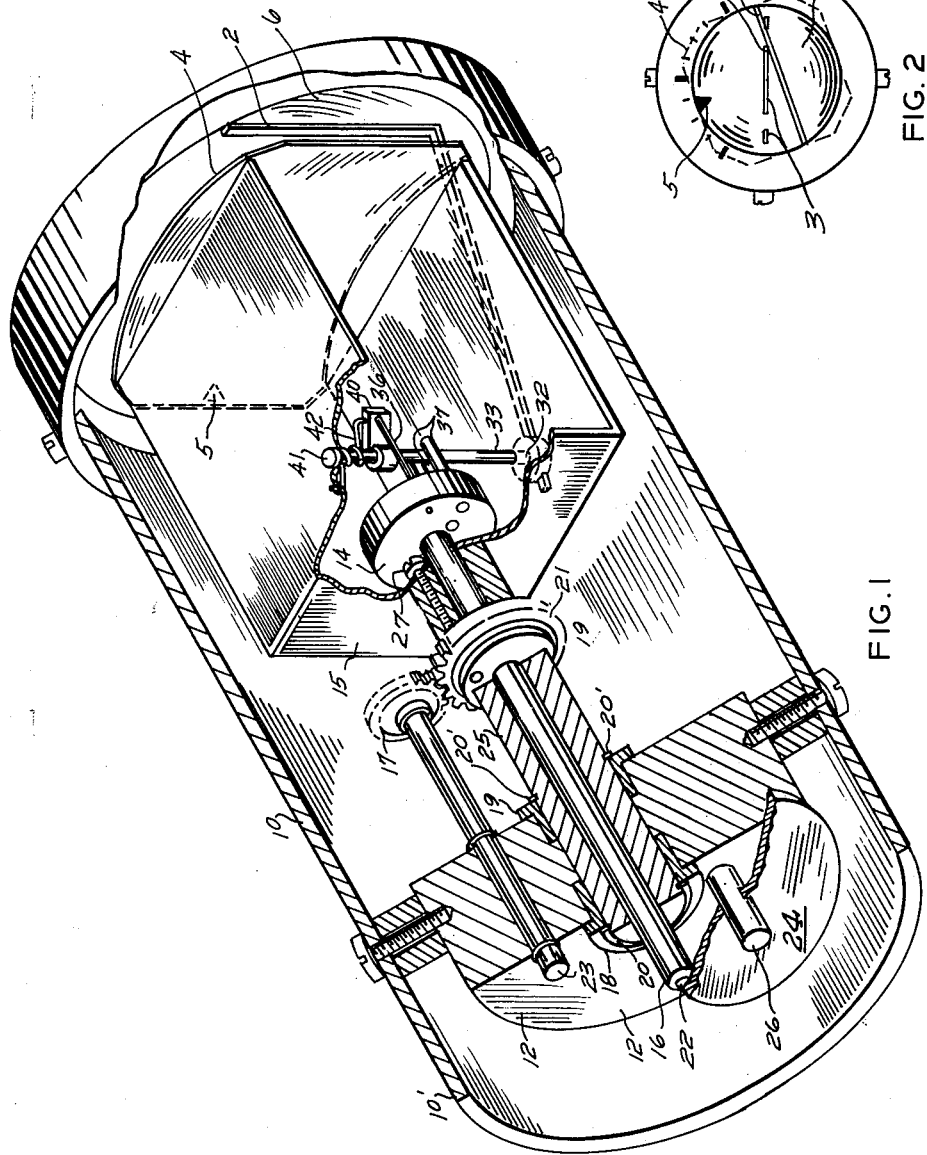

3,067,529
SIMULATED AIRCRAFT INSTRUMENTS
Joseph Ziegler, Binghamton, N.Y., assignor to General Precision, Inc., Link Division, Binghamton, N.Y., a corporation of Delaware
Filed Feb. 6, 1961, Ser. No. 87,196
3 Claims. (Cl. 35—12)

This invention relates to an improved simulated "attitude-horizon" instrument, such as a simulated "artificial horizon" instrument or simulated "attitude gyro" instrument for use in grounded trainers, flight simulators and the like. While a variety of simulated attitude-horizon instruments presently exist, most of them are extremely expensive, due in part, it is believed, to a slavish following of design and construction techniques taken from counterpart actual airborne instruments. Because of less favorable environmental conditions and for reasons of safety, it is desirable, of course, that jeweled bearings and other precision instrument manufacturing techniques be utilized in the making of actual airborne instruments. A need presently exists, however, for less expensive instruments, which can be incorporated into low cost trainers and simulators, but which will be accurate and reliable.

Thus it is a primary object of the present invention to provide an improved low-cost simulated attitude-horizon instrument which is inexpensive and reliable.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a perspective view of an illustrative embodiment of the invention, with various portions cut away for convenience of illustration; and FIG. 2 is a pictorial representation of the face of a typical attitude-horizon instrument constructed according to the invention.

A conventional "attitude gyro" display as used in most aircraft today includes marks 3, 3 defining an index line fixed with respect to the index case and deemed to represent the wings of the aircraft, by its position relative to a so-called pitch bar 2 which represents the horizon. As the aircraft pitches nose down, horizon bar 2 is moved upwardly relative to index line 3, and as the aircraft banks right wing downwardly, the right end of horizon bar 2 is rotated upwardly relative to the index line. For realistic simulation it is necessary that roll or bank rotation be maintained about an axis central to the instrument regardless of instantaneous pitch angle, or otherwise an extremely inaccurate and misleading indication may occur. Thus in a simulated instrument, it is usually most practical from a mechanical standpoint to have the banking mechanism bodily carry the pitching mechanism and rotate it about a central instrument axis, and such an arrangement is used in the present invention.

In FIG. 1 the mechanism is shown located within a conventional cylindrical instrument casing 10, half of which is cut away in FIG. 1 in order to reveal the details of the invention. Located near the rear end 10' of cylindrical casing 10 is a bearing support wall member 12 in which a plurality of shafts are journalled, each of the shafts being parallel to the cylinder axis of the instrument casing. The pitch motion input, which may be provided from a conventional pitch angle servo (not shown) is connected to rotate pitch input shaft 26. Shaft 26 is displaced from the central axis of the cylindrical instrument and provided with a fixedly mounted circular disc or swash plate 24 mounted at an angle other than normal on shaft 26. Plate 24 may be soldered or welded or otherwise fastened to shaft 26 very easily, since the precise angle which the plate 24 makes with the shaft 26 is in no way critical. If a round hole of a size slightly larger than the diameter of shaft 26 is drilled in the center of disc 24 the disc may be canted or tilted on shaft 26 prior to welding. The size and precise location of the hole in the disc are not critical. A reciprocating cam rod or shaft 16 is journalled through bearing 18 in wall 12 along the central axis of the instrument, and spring means to be described urge the ball pointed tip end 22 of shaft 16 against the front surface of swash plate 24. As swash plate 24 is rotated by rotation of input shaft 26, reciprocating shaft 16 will be cammed inwardly against the force of the spring means. An important feature of the invention is that irrespective of how inaccurately circular plate 24 is mounted to shaft 26, the rotary input motion at shaft 26 will be accurately converted to smooth sinusoidal reciprocating motion, the amplitude of which will depend upon the angular deviation of plate 24 from a normal or perpendicular plane. Also, the frequency, or phase, of the sinusoidal motion is inherently accurately geared to the rotation of shaft 26 without the need for any precise scaling or gearing and the device cannot get out of adjustment. Furthermore, if accidental uncontrolled pitch input rotation of great amount or great speed is applied to the pitch mechanism the device cannot be damaged, as no "stops" are required.

Shaft 16 extends through hollow shaft 25 and the center of drive gear 21 and through an opening in sheet metal yoke support member 15 to terminate at block 14. As shaft 16 reciprocates, it moves member 14, a block to which the forward end of shaft 16 is rigidly attached. Pusher arm 36 carried on the front of member 14 cams lever arm 40, which is rigidly attached to pitch shaft 33, thereby rotating shaft 33 against the force of coil spring 42, which is biased so to urge member 14 and shaft 16 rearwardly. Pitch shaft 33 is journalled between the arms of yoke member 15 and extends through one arm. Spring 42 is connected between shaft 33 and one arm of sheet metal yoke member 15. As now will be apparent, rotation of pitch shaft 33 will move horizon bar 2 in a realistic pitch motion about the axis of shaft 33. Bar 2 is rigidly mounted on the potion of shaft 33 which extends outside yoke 15. The amplitude of bar movement may be adjusted conveniently by adjusting the radial position at which pusher bar 36 butts on member 14, so as to change the effective lever length of lever arm 36. Pins 37, 37 extending from member 14 prevent undesired rotation of block member 14 and arm 36 relative to radial arm 40 and pitch shaft 33.

Pitch shaft 33 is journalled at each end in one arm of yoke member 15, which is preferably formed of light sheet metal to the shape shown. A conventional "attitude gyro" dial face 4 including an index mark such as shown at 5, and painted with the usual indicia (not shown) may be carried at the front ends of the arms of yoke 15. Glass 6 seals the front end of the instrument.

Hollow shaft 25, which is rotatably journalled in end wall 12 by means of bearings 18, 19, is prevented from moving endwise by retaining rings 20, 20' which engage grooves in shaft 25. Rigidly affixed to shaft 25 is drive gear 21, which is arranged to mesh with and be driven by gear 17. Thus as bank input shaft 23 is rotated by the trainer bank servo (not shown), gear 17 rotates gear 21. Because yoke member 15 is bodily affixed to gear 21, as by means of screw 27, yoke 15 and all the mechanism carried thereon will be rotated. Because hollow shaft 15 is centrally located, simulated banking occurs about the central instrument axis in realistic manner.

A further important feature of the invention is that all of the parts fit inside a cylindrical casing which may be entirely closed so as to exclude dust, dirt and moisture. All of the apparatus provided is simple, realistic and reliable, with no mechanical motions required which tend to stick or "lock up." Even if the rotary inputs to shafts 26 and 23 accidentally are exceeded, for instance due to electrical malfunction elsewhere in the trainer, neither the pitch action nor the bank action mechanisms of the present invention can be damaged, as there are no stops necessary to limit movement of the mechanisms.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limitnig sense.

Having described my invention what I claim as new and desire to secure by Letters Patent is:

1. A simulated attitude-horizon instrument for use in grounded aircraft trainers, comprising in combination: a generally cylindrical instrument casing having a rear end wall; a reciprocating shaft, a rotatable bank input shaft and a rotatable pitch input shaft journalled in said end wall; a swash plate located on said pitch input shaft and adapted to cam said reciprocating shaft as said pitch shaft is rotated; a first gear and a yoke member journalled for rotation on said reciprocating shaft, said gear and yoke member being rigidly attached to each other, said yoke member having two arms; a pitch action shaft journalled between said arms of said yoke member; a lever arm rigidly attached to and extending radially outward perpendicularly to said pitch action shaft; a spring connected between said pitch action shaft and one arm of said yoke, said reciprocating shaft being aligned with said lever arm so as to rotate said pitch action shaft as said swash plate cams said reciprocating shaft; a simulated horizon bar rigidly attached to said pitch action shaft and adapted to move in pitch direction as said pitch action shaft is rotated; and a second drive gear connected to mesh with said first gear and driven by said bank input shaft, thereby to rotate said yoke member about a central instrument axis defined by said reciprocating shaft as said bank input shaft is rotated.

2. A simulated attitude-horizon instrument for use in grounded aircraft trainers comprising in combination: a generally cylindrical instrument casing having a rear end wall; a reciprocating central shaft coaxial with said cylindrical housing and a rotatable pitch motion input shaft both journalled in said end wall; a swash plate carried on said pitch motion input shaft located to cam said reciprocating central shaft inwardly as said pitch motion input shaft is rotated; and a rotatable yoke member carrying a movable simulated horizon bar and a simulated instrument face, said yoke member being journalled on said reciprocating shaft, said reciprocating shaft being connected to move said simulated horizon bar as said pitch motion input shaft is rotated.

3. A simulated attitude-horizon instrument for use in grounded aircraft trainers, comprising in combination: a generally cylindrical instrument casing having a rear end wall member; a yoke member carrying a simulated horizon bar and simulated instrument face, said yoke member being carried on a hollow shaft which is journalled in said wall member to rotate about the central axis of said cylindrical casing; and a reciprocating shaft disposed inside said hollow shaft and connected to move said horizontal bar with respect to said simulated instrument face in simulated pitch motion.

References Cited in the file of this patent
UNITED STATES PATENTS

| | | |
|---|---|---|
| 2,578,177 | Dehmel | Dec. 11, 1951 |
| 2,874,486 | Leuthold | Feb. 24, 1959 |